United States Patent
Gruber et al.

(10) Patent No.: US 11,415,668 B2
(45) Date of Patent: Aug. 16, 2022

(54) SWITCHING DEVICE FOR A RADAR TARGET EMULATOR AND RADAR TARGET EMULATOR HAVING SAID TYPE OF SWITCHING DEVICE

(71) Applicant: AVL LIST GMBH, Graz (AT)

(72) Inventors: Andreas Gruber, Graz (AT); Michael Ernst Gadringer, Graz (AT); Helmut Schreiber, Graz (AT); Michael Vorderderfler, Graz (AT)

(73) Assignee: AVL List GmbH, Graz (AT)

( * ) Notice: Subject to any disclaimer, the term of this patent is extended or adjusted under 35 U.S.C. 154(b) by 410 days.

(21) Appl. No.: 16/474,799

(22) PCT Filed: Dec. 28, 2017

(86) PCT No.: PCT/EP2017/084692
§ 371 (c)(1),
(2) Date: Jun. 28, 2019

(87) PCT Pub. No.: WO2018/122292
PCT Pub. Date: Jul. 5, 2018

(65) Prior Publication Data
US 2020/0300968 A1    Sep. 24, 2020

(30) Foreign Application Priority Data

Dec. 29, 2016 (AT) .............................. A 51190/2016
Oct. 6, 2017 (DE) ........................ 102017217800.0

(51) Int. Cl.
*G01S 7/40* (2006.01)
*G01S 13/10* (2006.01)
*G01S 13/931* (2020.01)

(52) U.S. Cl.
CPC ............ *G01S 7/4052* (2013.01); *G01S 13/10* (2013.01); *G01S 13/931* (2013.01); *G01S 7/4065* (2021.05); *G01S 7/4095* (2021.05)

(58) Field of Classification Search
USPC ......................................................... 342/169
See application file for complete search history.

(56) References Cited

U.S. PATENT DOCUMENTS 3,002,188 A  *  9/1961  Abbott ..................... H01Q 3/34
                                                                342/373
3,903,521 A        9/1975  Jensen et al.
(Continued)

FOREIGN PATENT DOCUMENTS

CN    103809163    5/2014
CN    104391283    3/2015
(Continued)

OTHER PUBLICATIONS

Z. Duan and Z. Xiang, "Finite-time boundedness and I1-gain analysis for discrete positive switched systems with time-varying delay," Proceedings of the 32nd Chinese Control Conference, 2013, pp. 2090-2095. (Year: 2013).*

(Continued)

*Primary Examiner* — Olumide Ajibade Akonai
*Assistant Examiner* — Alexander L. Syrkin
(74) *Attorney, Agent, or Firm* — Sheridan Ross P.C.

(57) ABSTRACT

A switching device for a radar target emulator is provided comprising: at least one first switch arrangement and a second switch arrangement, each having a branching device designed to receive a first input signal and diverge it into a branch signal and a first output signal, a switch adapted to transmit the branch signal in a first switching state within the switch arrangement and to not transmit in a second switching state, and adding means designed to emit the signal (Continued)

transmitted in the first switching state of the switch, at least as components of a second output signal. The first switching arrangement and the second switching arrangement are interconnected in such a way that a first input signal of the second switching arrangement comprises a first output signal of the first switching arrangement, or a second input signal of the second switching arrangement comprises a second output of the first switching arrangement.

19 Claims, 4 Drawing Sheets

(56) References Cited

U.S. PATENT DOCUMENTS

| | | | | |
|---|---|---|---|---|
| 4,316,159 | A | * | 2/1982 | Ho ............... H04B 7/18515 333/104 |
| 4,660,041 | A | | 4/1987 | Maples et al. |
| 5,247,843 | A | | 9/1993 | Bryan |
| 5,339,087 | A | | 8/1994 | Minarik |
| 5,518,400 | A | | 5/1996 | Otiode et al. |
| 5,862,455 | A | | 1/1999 | Martin et al. |
| 5,892,479 | A | | 4/1999 | Mills et al. |
| 6,191,735 | B1 | * | 2/2001 | Schineller ............ H01P 1/185 333/164 |
| 6,346,909 | B1 | | 2/2002 | Johnson et al. |
| 6,624,780 | B1 | | 9/2003 | Fouts et al. |
| 6,989,788 | B2 | * | 1/2006 | Marion ............... H01P 1/185 333/164 |
| 8,248,297 | B1 | | 8/2012 | Baker et al. |
| 2003/0222693 | A1 | * | 12/2003 | Cohen ............... H03K 5/131 327/277 |
| 2004/0012517 | A1 | | 1/2004 | Abou-Jaoude et al. |
| 2004/0201518 | A1 | | 10/2004 | Pace et al. |
| 2007/0285315 | A1 | * | 12/2007 | Davis ............... H01Q 3/2629 342/377 |
| 2009/0309783 | A1 | | 12/2009 | Shih et al. |
| 2010/0109940 | A1 | | 5/2010 | Williams |
| 2014/0197983 | A1 | | 7/2014 | Reuter |
| 2015/0350223 | A1 | | 12/2015 | Spivack |
| 2016/0245900 | A1 | * | 8/2016 | Hurtarte ............... G01S 7/4052 |
| 2017/0115378 | A1 | | 4/2017 | Haghighi et al. |
| 2017/0132334 | A1 | | 5/2017 | Levinson et al. |
| 2017/0307732 | A1 | | 10/2017 | Haghighi et al. |
| 2018/0019755 | A1 | | 1/2018 | Josefsberg et al. |
| 2019/0391234 | A1 | | 12/2019 | Gruber et al. |
| 2020/0025875 | A1 | | 1/2020 | Maier |

FOREIGN PATENT DOCUMENTS

| | | | |
|---|---|---|---|
| CN | 105510980 | 4/2016 | |
| CN | 106802593 | 6/2017 | |
| DE | 2523288 | 12/1976 | |
| DE | 3888993 | 10/1994 | |
| DE | 69221121 | 3/1998 | |
| DE | 102007002370 | 7/2008 | |
| DE | 112012004728 T5 * | 7/2014 | ............ G06F 30/20 |
| DE | 102014017831 | 6/2016 | |
| DE | 102014118622 | 6/2016 | |
| DE | 102014118625 | 6/2016 | |
| DE | 102015121297 | 3/2017 | |
| EP | 0061559 | 10/1982 | |
| EP | 1341000 | 9/2003 | |
| GB | 2444161 | 5/2008 | |
| JP | 60223303 A * | 11/1985 | ............... H01P 1/15 |
| JP | S60-223303 | 11/1985 | |
| JP | H04-212083 | 8/1992 | |
| JP | H07-280924 | 10/1995 | |
| JP | H09-230029 | 9/1997 | |
| JP | H09-270772 | 10/1997 | |
| JP | 2001-524676 | 12/2001 | |
| JP | 2003-149324 | 5/2003 | |
| JP | 3928837 B2 * | 6/2007 | ............ G05F 3/205 |
| KR | 10-2016-0050121 | 5/2016 | |
| WO | WO 99/08129 | 2/1999 | |
| WO | WO 2011/008146 | 1/2011 | |
| WO | WO 2016/025683 | 2/2016 | |

OTHER PUBLICATIONS

International Search Report prepared by the European Patent Office dated Mar. 7, 2018, for International Application No. PCT/EP2017/084692.
Mukti et al. "A preliminary result on development of analog broadband tapped delay line for L-band applications," International Seminar on Intelligent Technology and Its Applications (ISITIA), Lombok, Indonesia, Jul. 2016, pp. 357-362 (Abstract only).
Search Report for German Patent Application No. 102017217800.0, dated Jul. 25, 2018, 8 pages.
English Translation of International Preliminary Report on Patentability for International (PCT) Patent Application No. PCT/EP2017/084692, dated Jul. 11, 2019, 13 pages.
U.S. Appl. No. 16/753,848, filed Apr. 6, 2020, Gruber et al.
U.S. Appl. No. 16/753,866, filed Apr. 6, 2020, Gadringer et al.
Mcmillian et al. "A 500 MHz GaAs digital RF memory modulator IC," Gallium Arsenide Integrated Circuit (GAAS IC) Symposium, 1996, Technic AL Digest 1996, 18th Annual Orlando, Fl. USA, Nov. 3-6, 1996, IEEE, pp. 73-76.
Vorderderfler et al. "Frequency dividers in radar target stimulator applications," Elektrotechnik & Informationstechnik, 2018, vol. 135, No. 4-5, pp. 344-351.
Official Action for Austria Patent Application No. A 51190/2016, dated Aug. 10, 2017, 3 pages.
Decision to Grant for Austria Patent Application No. A 51190/2016, dated Jun. 21, 2018, 2 pages.
"Potentiometer," Wikipedia, 2022 retrieved from https://en.wikipedia.org/w/index/.php?title=Potenionmeter&oldid=1073049969, 10 pages.

* cited by examiner

SWITCHING DEVICE FOR A RADAR TARGET EMULATOR AND RADAR TARGET EMULATOR HAVING SAID TYPE OF SWITCHING DEVICE

CROSS REFERENCE TO RELATED APPLICATIONS

This application is a national stage application under 35 U.S.C. 371 and claims the benefit of PCT Application No. PCT/EP2017/084692 having an international filing date of 28 Dec. 2017, which designated the United States, which PCT application claimed the benefit of Austria Patent Application No. A51190/2016 filed 29 Dec. 2016 and German Patent Application No. 10 2017 217 800.0 filed 6 Oct. 2017, the disclosures of each of which are incorporated herein by reference in their entireties.

The present invention relates to a switching device for a radar target emulator.

The complexity of mobile systems, in particular of land-based motor vehicles such as, for example, passenger cars, trucks or motorcycles, has been steadily increasing for years. Alongside reducing emissions and/or fuel consumption or increasing driving comfort, this is also occurring to facilitate the management of steadily increasing traffic in urban areas. This is generally the purview of driver assistance systems which support the driver in standard and/or extreme situations in the form of information and/or actively intervening in the vehicle behavior based on vehicle-internal sensors and/or communication with other vehicles and/or with stationary points and/or services relative to the vehicle environment, in particular the prospective route.

Radar sensors are frequently used at least as one component of the above-cited sensor technology, these monitoring the direct surroundings of the vehicle relative to obstacles and/or preceding vehicles or the like. Known with respect to the evaluating of such assistance systems is supplying these sensors with information about a test scenario, in particular a virtual test scenario, and evaluating the response of the assistance system.

The cited radar sensors are frequently pivotable in a horizontal plane (azimuth plane) and a vertical plane (elevation plane), whereby, among other things, increased spatial resolution can be rendered possible and unrealistic objectives such as for example point targets identified. In evaluating such an assistance system, it needs to be supplied with corresponding information by way of the, in particular virtual, test scenario.

DE 38 88 993 T2 relates to an apparatus for monitoring radar performance. Provided to that end is a radar performance monitor having a closed loop which comprises a delay line system in order to produce the plurality of simulated radar target return signals. A series of simulated radar target returns are generated under the control of a multiplexer control. The number of target returns generated is determined by the length of time that the multiplexer control enables the R-port of the multiplexer. In one exemplary embodiment, a radar performance monitor comprises a closed delay line. The delay line thereby delays signals only after a plurality of individual radar target signals have been generated, as for example FIG. 2 of the cited printed publication shows.

U.S. Pat. No. 5,247,843 relates to a system and a method for simulating electromagnetic environments, wherein an array of one more horns emits electromagnetic signals at apparent angles to a receiving antenna.

WO 2016 02225 683 A1 relates to a method and an apparatus for determining a misalignment of a radar sensor unit, wherein an alignment device provides a plurality of targets in an array and two targets are in each case horizontally and vertically aligned relative to each other.

In light of the above, it is a task of the present invention to specify a switching device for a radar target emulator or, respectively, a radar target emulator having such a switching means which improves upon the prior art.

This task is solved in the sense of the present invention by a switching device for a radar target emulator in accordance with claim 1, a time delay device in accordance with claim 6, and a radar target emulator having such a switching device in accordance with claim 7.

One aspect of the present invention relates to a switching device for a radar target emulator, particularly of the type as described herein, comprising: at least one first switch arrangement and one second switch arrangement, each having a branching device which is designed to receive a first input signal, to branch it into a branch signal and a first output signal; a switching means which is designed to transmit the branch signal in a first switching state within the switch arrangement and not transmit in a second switching state; and an adder device which is designed to output the signal transmitted in the first switching state of the switching means at least as a component of a second output signal, wherein the first switch arrangement and the second switch arrangement are interconnected in such a manner that a first input signal of the second switch arrangement comprises, in particular forms, a first output signal of the first switch arrangement, or a second input signal of the second switch arrangement comprises, in particular forms, a second output signal of the first switch arrangement.

This is in particular advantageous since an at least substantially all-analog switch architecture can thereby be used for the interconnecting and transmitting of the radar waves. The switch architecture can, however, also at least partly contain digital elements. Moreover, a plurality of radar targets at different distances and/or different positions in the azimuth plane and/or elevation plane can be readily emulated. Alternatively or additionally, the expansion of individual targets along the azimuth plane and/or elevation plane can also be emulated. Due to the scalable structure of the switching device, a simple and flexible expanding of said switching device is possible, in particular with respect to the number of radar targets able to be emulated and/or the possible target distances and/or positions of the targets.

A "switching device" in the sense of the present invention is in particular an apparatus which is provided, in particular configured, to output a plurality of input signals as one output signal or as a plurality of output signals depending on the respective application, wherein the switching device is particularly provided, in particular configured, to output any combination of input signals at one or more outputs, whereby the output signals which are output at different outputs, in particular independently of one another, may consist of part of the input signals or all of the input signals. In some applications, no input signal might even be output at one or more outputs.

A "radar target emulator" in the sense of the present invention is in particular a device for stimulating a sensor, in particular a vehicle, which in particular receives a radar signal of the sensor, modulates it and returns it to the sensor, wherein the test scenario is imaged during modulation in order to determine and evaluate the response of a vehicle control unit in this, in particular virtual, test scenario.

A "switch arrangement" in the sense of the present invention is in particular a type of "elementary cell" of the switching device. The switch arrangement is in particular an apparatus for the controlled transmitting of a signal, in particular a radar signal, which is provided, in particular configured, to receive a signal, in particular a radar signal, branching it, emitting a first part of the input signal as a first output signal and transmitting or not transmitting a second part as a branch signal according to the respective switching state.

A "branching device" in the sense of the present invention is an electrically, in particular passive, component in the field of high-frequency technology which serves to branch electromagnetic power described as a guided wave, or respectively decouple or couple it into a conductive structure. According to one embodiment, branching devices in the sense of the present invention exhibit a bridge circuit comprising transformers and capacitors or a line coupler, configured for example on an electrical circuit board as strip lines or with a combination of waveguides. A branching device can in particular be a directional coupler, an asymmetric Wilkinson divider, a transistor amplifier having two outputs, or even a transformer with two independent output coils.

A "switching means" in the sense of the present invention in particular comprises a switch which is provided, in particular configured, to transmit or not transmit a signal depending on the respective switching state.

An "adder device" in the sense of the present invention is in particular an electrically passive component in the field of high-frequency technology which serves to couple electromagnetic power described as a guided wave into a conductive structure. According to one embodiment, adders in the sense of the present invention exhibit a bridge circuit comprising transformers and capacitors or a line coupler configured for example on electrical circuit boards as strip lines or a combination of waveguides. Adder devices in the sense of the present invention can however also be actively realized, for example by using a summing circuit with broadband operational amplifiers.

According to one implementation of the present invention, the switching device comprises further switch arrangements which at least substantially correspond in configuration to that of the first and/or second switch arrangement, wherein a first input signal of an in particular directly downstream switch arrangement comprises, in particular forms, a first output signal of the respective, in particular directly upstream, switch arrangement.

This is particularly advantageous since at least substantially identical "elementary cells" can in this way be used to expand the switching device according to the respective task. According to one implementation, the first output signal of an upstream switch arrangement, in particular a directly upstream switch arrangement, is a first input signal of an, in particular directly, downstream switch arrangement. This implementation is further particularly advantageous since the first input signal of the upstream switch arrangement thereby at least substantially corresponds to the first input signal of the downstream switch arrangement so that the input signal can be used at least substantially identically by both switch arrangements. In this way, at least substantially the same input signal can be provided to a plurality of downstream receivers as needed.

According to a further implementation, the switching device comprises further switch arrangements which at least substantially correspond in configuration to that of the first and/or second switch arrangement, wherein a second input signal of an in particular directly downstream switch arrangement comprises, in particular forms, a second output signal of the respective, in particular directly upstream, switch arrangement.

This is particularly advantageous since at least substantially identical "elementary cells" can in this way be used to expand the switching device according to the respective task. According to one implementation, the first output signal of an upstream switch arrangement, in particular a directly upstream switch arrangement, is a first input signal of an, in particular directly, downstream switch arrangement. This is further particularly advantageous since the second input signal of the upstream switch arrangement thereby can or cannot be combined with an additional signal depending on the switching state of the switching means. According to one implementation, when the switching means of the downstream switch arrangement is in the first switching state, the second output signal of the upstream switch arrangement is combined with the branch signal of the downstream switch arrangement in the downstream switch arrangement. According to one implementation, when the switching means of the downstream switch arrangement is in the second switching state, the second output signal of the upstream switching means is not combined with the branch signal of the downstream switching arrangement and the second output signal of the upstream switch arrangement is output at least substantially unchanged as the second output signal of the downstream switch arrangement. This is further particularly advantageous since one or more input signals can in this way be changed depending on the switching state of the switch arrangements.

According to a further implementation, the switch arrangements are connected in the form of a matrix, wherein the switch arrangements are in particular arranged at intersecting points of the matrix. In other words: According to one implementation of the present invention, the switch arrangements are connected in the form of a matrix, wherein the switch arrangements in particular form the elements of the matrix. According to one implementation of the present invention, the matrix, starting from a (1×2) or (2×1) configuration, can be extended at will. This is in particular advantageous since a correspondent matrix of switch arrangements can in this way be connected into a switching device depending on application. So doing improves the flexibility of the switching device according to this implementation of the present invention and in particular that of the radar target emulator described below within the meaning of the present invention.

According to a further implementation of the present invention, the matrix comprises a plurality of rows and/or columns. According to one implementation of the present invention, the columns of the matrix represent different distances from emulated objects in the course of the radar target emulation and the rows different objects to be emulated. That means, according to one preferential implementation, each column represents a different time delay and each row a different object. According to another implementation of the present invention, the columns of the matrix represent different positions of the objects to be emulated, in particular in the azimuth plane or the elevation plane, particularly with respect to the radar sensor. That means, according to one preferential implementation, each column represents a different position and each row a different object.

The matrix-like interconnection enables on the one hand a corresponding distance to be assigned to each object at the end of each row and, on the other hand, a corresponding position, particularly in the azimuth or elevation plane, to be assigned to each object at the end of one or more columns and/or the expansion of individual objects, particularly in these planes, to be determined.

In a further implementation of the present invention, the first and second switch arrangement and any further switch arrangements as applicable each comprise a variable attenuating and/or amplifying device designed to amplify and/or attenuate the branch signal. Preferably, the variable attenuating and/or amplifying device is thereby arranged downstream the switching means in terms of the direction of signal. In one preferential implementation, the variable attenuating and/or amplifying device thereby comprises a signal amplifier for amplifying the signal transmitted in the first switching state of the switching means as well as a signal attenuator for attenuating the signal transmitted in the first switching state of the switching means.

The signal transmitted in the first switching state of the switching means can thereby be adapted, in particular with respect to the second input signal of the switch arrangement, such that in particular the second output signal output at a last switch arrangement in the signal direction contains a predetermined portion of the signal transmitted in the first switching state of the switching means. In particular, the signal transmitted in the first switching state of the switching means can also be adapted with respect to the first output signal of the branching device. Particularly flexible signal routing is thereby enabled.

In a further implementation of the invention, the weighting of an original signal, which preferably represents an object and is contained in a plurality of second output signals of adjacent switching devices based on the corresponding control of one or several switching means, is determined by means of the variable attenuating and/or amplifying device. This thereby enables easily emulating an expansion of the object. In particular, individual signal components of the modulated output signal can be weighted independently of each other and distributed at this weighting to for example a plurality of antenna devices of a radar target emulator.

A further aspect of the present invention is directed toward a radar target emulator. In one embodiment, the inventive radar target emulator comprises: at least one first switching device of the type described herein, at least one time delay array having a time delay device designed to receive and delay an original signal and/or a branching device output signal of an upstream time delay array and provide it as a delayed signal, and a branching device designed to receive the delayed signal, branching it into a branch signal and a first output signal and feeding the branch signal to at least one of the switch arrangements of the first switching device as the first input signal, and output the first output signal, and at least one target emulation array designed to receive the second output signal of in particular the last switch arrangement of the first switching device in the signal direction, modulate the signal of the second output signal and provide a modulated output signal.

In an another embodiment, the radar target emulator comprises: at least one second switching device of the type described herein, at least one time delay array having a time delay device designed to receive and delay an original signal and/or a delayed signal of an upstream time delay device and provide it as a delayed signal, and at least one target emulation array designed to receive the delayed signal, modulate the signal of the delayed signal and provide a modulated output signal, wherein the output signal provided by the target emulation array is provided as a second input signal to particularly a first switch arrangement of the second switching device in the direction of signal.

According to the concerted inventive concept of both above-described embodiments of the radar target emulator, the first and/or second switching device with the at least one first switch arrangement and the at least one second switch arrangement allows flexible signal routing of a time-delayed original signal in which the signal components of the original signal can be provided, at a predetermined weighting as applicable, to one or more outputs, in particular to at least a last switch arrangement in the signal direction, of the first and/or second switching device in a freely selectable way. In the one implementation, different delays can thus be generated; in the other implementation, differently modulated signals can be differently distributed or overlain.

A "time delay array" in the sense of the present invention is in particular configured to receive and delay a signal, in particular a radar signal, particularly from a vehicle, such that objects at different, in particular virtual, distances to the sensor, in particular to a radar sensor, can be emulated as the signal continues.

A "time delay device" in the sense of the present invention in particular comprises a so-called delay line configured for example as a coaxial cable.

A "target emulation array" is a configuration which receives the original signal delayed by the time delay array, and also by the first switching device as the case may be depending on application, modulates the signal thereof, in particular so as to modulate to the object to be emulated, and provides the thus modulated output signal.

The time delay array, in particular the time delay device, and/or the target emulation array are of at least partly analog configuration in one preferential implementation of the invention; i.e. at least partially constructed from analog electrical components. This enables particularly short processing times in which the radar signal is processed, in particular delayed and/or modulated, so that objects at short, in particular virtual, distances to the radar sensor, preferably under 30 m, in particular under 20 m, can also be emulated.

Alternatively, the time delay array, in particular the time delay device, and/or the target emulation array are of at least partly digital configuration; i.e. comprising a central processing unit which is designed to replace at least one analog component by digitally simulating the function of the at least one analog component. Preferably, the time delay array, in particular the time delay device, and/or the target emulation array are at least partially implemented as a computer program which when executed on a corresponding central processing unit fulfills the function associated with the above-cited time delay array, in particular the time delay device, and/or the target emulation array. The delaying or respectively modulating of the radar signal can thus be flexibly adapted to changing requirements; i.e. a changed number of objects to be emulated or their, in particular virtual, distances.

This is in particular advantageous since, on the one hand, a single time delay array, in particular in conjunction with the first switching device, can thereby be used to at least substantially emulate any number of objects with just one single time delay array and, on the other hand, a previously delayed and suitably modulated original signal for emulating an object, in particular of the second switching device, can be received and output to different outputs, in particular as the second output signal of a plurality of switch arrangements of the second switching device, according to a predefined spatial distribution.

In contrast to the prior art known to the applicant, in which a separate time delay array needs to be at least substantially provided for each object to be imaged, only one time delay array is now sufficient according to one implementation of the present invention to depict a plurality of objects, in particular any given number of objects. To that end, the time delay array in one implementation comprises a plurality of series-connected time delay devices, respectively connected together by at least one branching device of the type described herein. The time delay devices are thereby configured to realize respectively different and/or respectively identical or any given combinations of time delays. This is achieved for example by interconnecting coaxial cables of the same and/or different lengths.

According to one implementation of the present invention, the time delay array of the radar target emulator comprises an amplifying device which is designed to amplify the first input signal prior to it being fed to at least one of the switch arrangements. This is particularly advantageous since in doing so, only a comparatively small part of the signal to be delayed needs to be branched off as a branch signal and the signal intensity in the time delay device(s) remains at least substantially constant.

According to a further implementation of the present invention, the radar target emulator comprises at least two transmitter devices designed to receive a second output signal of in particular a last switch arrangement of the second switching device in the signal direction and emit it as electromagnetic radiation. In particular, the second switching device is designed to output to a respective transmitter device each of the second output signals it in particular generates or compiles. The transmitter devices are thereby preferably spatially distanced from each other, in particular spatially distributed within a predetermined area. In one preferential implementation of the invention, the predetermined area can be a one-dimensional area, in particular a line. Alternatively, the predetermined area can be a two-dimensional area, in particular a surface.

Preferably, the number of transmitter devices thereby corresponds to a number of electrically connected, adjacently arranged; i.e. interconnected, switch arrangements of the second switching device so that each of the second output signals can be received by a respective transmitter device and emitted in the form of electromagnetic radiation.

According to a further implementation of the invention, at least two of the at least two transmitter devices are adjacently arranged, in particular along a line, such that objects emulated by means of the emitted electromagnetic radiation can be depicted in an azimuth angular field. Alternatively or additionally, at least two of the at least two transmitter devices are arranged in particular along a line such that objects emulated by means of the emitted electromagnetic radiation can be depicted in an elevation angular field. Preferably, at least two of the at least two transmitter devices are thereby arranged along a curved line which in some implementations exhibits a radius of curvature. A midpoint of the curved line thereby preferably corresponds to the position of a radar sensor, in particular a motor vehicle.

Thus, one or more emulated objects in different positions, in particular along a line in an azimuth plane or an elevation plane, can be in particular independently output to the radar sensor or respectively depicted for the radar sensor by the at least two adjacently arranged transmitter devices. Alternatively or additionally, the one or more emulated objects can be (virtually) moved, in particular independently and in particular along said line. Moreover possible is the allocating of an expansion to individual emulated objects by the correspondingly modulated signal being weighted and emitted as electromagnetic radiation by a plurality of adjacent transmitter devices, in particular at different angles and in particular in the direction of the radar sensor.

On the basis of the time delay of the second output signals received by the transmitter devices, via which a (virtual) distance to the radar sensor can be defined, it is also possible to fix the object to be emulated not only in the above-cited area, in particular along the above-cited line, but also within the entire azimuth plane or elevation plane; i.e. freely position the object to be emulated in the azimuth plane or elevation plane.

Since individual signals representing emulated objects can be readily switched to different transmitter devices, it is not necessary to move the radar target emulator relative to a radar sensor or vice versa in order to generate radar signals able to be received from the radar sensor from different directions.

According to a further preferential implementation of the invention, the radar target emulator moreover comprises at least one further time delay array having a time delay device which is designed to receive and delay a further original signal and provide it as a delayed further signal. Preferably, at least one further target emulation array is designed to receive the delayed further signal, modulate the signal of the delayed further signal, and provide a modulated further output signal, whereby the modulated output signals and modulated further output signals provided by the at least one target emulation array and the at least one further target emulation array are provided as second input signals to in particular a first switch arrangement of the second switching device in the signal direction. In particular, a plurality of time delay arrays can in each case be configured to receive and delay a respective signal of a plurality of original signals, wherein each of the delayed signals provided by the respective plurality of time delay arrays is received by a respective target emulation array, modulated and provided as a modulated output signal. The switching device thereby preferably exhibits a number of first switch arrangements, particularly in the direction of signal, which corresponds to the number of target emulation arrays.

Original signals of different sources or original signals associated with different detection areas of a radar sensor can thereby be processed and incorporated into an emulated traffic environment. For example, an original signal can characterize a radar signal able to detect objects located in front of the radar sensor in a main radar sensor detection area while at least one further original signal characterizes a radar signal able to detect the object to the side of the main detection area relative to the radar sensor. Hence, (virtual) objects located in different detection areas which are part of the traffic environment to be emulated can also be emulated and ultimately imaged for the radar sensor.

According to a further preferential implementation of the invention, the radar target emulator comprises at least two receiver devices, each designed to detect a radar signal output by a radar sensor and provide a corresponding original signal. The time delay device of the at least one time delay array is thereby preferably configured to receive an original signal provided by one of the at least two receiver devices. The time delay device of the at least one further time delay array is preferably designed to receive a further original signal provided by a further of the at least two receiver devices. The receiver devices are thereby preferably arranged with respect to the radar sensor so as to be able to detect radar signals output by the radar sensor in different radar sensor detection areas. In particular, the receiver devices can be configured to receive radar signals of different radar sensor frequencies.

Preferably, at least one receiver device is configured to detect radar signals of the radar sensor located in a main radar sensor detection area in front of the radar sensor and generate at least one corresponding original signal. Further preferably, at least one further receiver device is configured to detect radar signals of the radar sensor in a secondary detection area located to the side of the main detection area relative to the radar sensor and generate a corresponding further original signal.

The radar signals output by the radar sensor for detecting objects can thus be detected within a spatially large angular field.

According to one implementation of the present invention, the target emulation array comprises: a vector modulation device designed to modulate the second output signal, in particular of the last switch arrangement of the first switching device in the signal direction or the delayed signal provided by the at least one time delay array by means of Doppler shift signal modulation and provide it in the form of an intermediate signal, and/or an adder device which is designed to output the intermediate signal as at least part of a modulated output signal. This is particularly advantageous as the second output signal or the time-delayed original signal can in this way be modulated to the object to be depicted. In one implementation, the adder device enables the signals modulated in said vector modulation device to be combined with signals of further vector modulation devices in order to thus output an output signal of the radar target emulator which emulates a plurality of objects at the same and/or a different distance.

According to a further implementation of the present invention, the target emulation array further comprises a variable attenuating and/or amplifying device which is in particular designed to adjust the amplitude of the intermediate signal prior to it being supplied to the adder device or that of the Doppler-shifted modulated signal prior to output to a switch arrangement of the second switching device. This is in particular advantageous because so doing enables radar target emulation to be generated at higher imaging accuracy.

According to a further advantageous embodiment of the present invention, the radar target emulator comprises an interference signal arrangement having an interference signal supply device designed to provide an interference signal and an adder device designed to output the interference signal as at least part of a modulated output signal.

This is particularly advantageous since doing so also enables the emulating of interfering influences which occur in reality such as, for example, wind, rain, snow, particulate matter, leaves, etc., which can hinder "ideal" sensing of the environment under real conditions. According to one advantageous further development of the present invention, the interference signal arrangement comprises a variable attenuating and/or amplifying device which is designed to adjust the amplitude of the interference signal prior to being fed to the adder device. This is particularly advantageous since doing so provides a further possibility for adapting the emulated signal to the test scenario. In particular, the correspondence between real-world operation and test environment is thereby increased.

According to another advantageous further development of the present invention, the interference signal arrangement is connected in signal-conducting manner to a target emulation array, whereby the intermediate signal of the target emulation array is at least partially transmitted prior to being supplied to the adder device and whereby said intermediate signal serves as the basis for providing the interference signal, particularly in order to provide a synchronous interference signal. This is particularly advantageous according to one implementation since doing so enables the emulating of interference signals able to be associated with a corresponding distance.

According to a further implementation of the present invention, the target emulation array further comprises: at least one further switching device of the type described herein and at least one further time delay array having a time delay device designed to receive and delay the second output signal or a first output signal of an upstream further time delay array and provide it as a delayed signal; and a branching device designed to receive the delayed signal, branching it into a branch signal and an output signal, supplying the branch signal to at least one of the further switch arrangements as an input signal, and output said output signal. As previously described above, this is particularly advantageous since a separate delay line does not thereby need to be provided for each distance, as known in the known prior art, but rather only one, in particular composite, delay line is sufficient in order to emulate a plurality, in particular any given number, of distances.

In a further implementation of the present invention, the radar target emulator comprises a first switching device and a second switching device, wherein the at least one target emulation array is connected to the first and second switching device such that the target emulation array receives a second output signal of a last switch arrangement of the first switching device in the signal direction, modulates the signal of the second output signal, and provides a modulated output signal as an input signal to a first switch arrangement of the second switching device in the signal direction.

In other words, this embodiment of the invention provides a radar target emulator by advantageously combining features of a radar target emulator having a first switching device with features of a radar target emulator having a second switching device. The first switching device is thereby preferably connected to at least one time delay array and at least one target emulation array such that at least one first input signal received from at least one switch arrangement of the first switching means, which contains a signal delayed by the time delay array, is in particular formed, contained at least partially in at least one second output signal of at least one switch arrangement of the first switching device able to be received and modulated by at least one target emulation array. The second switching device is thereby preferably connected to the at least one target emulation array such that at least one first input signal of at least one switch arrangement of the second switching device contains, in particular forms, a modulated output signal of the at least one target emulation array.

Preferably, a plurality of in particular last switch arrangements of the first switching device in the signal direction are thereby in each case connected to a respective target emulation array so that different time-delayed components of the original signal can be received as second output signals from a respective target emulation device as a result of the time delay arrangement in conjunction with the first switching device. Furthermore, a plurality of in particular first switch arrangements of the second switching device in the signal direction is in each case preferably connected to a respective target emulation array such that the modulated output signals of the target emulation arrays can be provided, if necessary weighted, to one or more of a plurality of in particular last switch arrangements of the second switching device in the signal direction by means of the entirety of switch arrangements of the second switching device.

Preferably, the generation of virtually any time-delayed and differently modulated signals, preferably each representing an emulated object, is thereby combined with the arbitrary distribution of these signals to different outputs of the second switching device by only one time delay arrangement in conjunction with the first switching device, in particular for providing to different transmitting devices. Advantageously, the time delay of a modulated signal and its output location, in particular relative to a radar sensor, can thus be freely selected and in particular dynamically changed. The scalability of the first and second switching devices thereby allows readily expanding the radar target emulator to display additional emulated objects.

The invention will be described in greater detail in the following on the basis of non-limiting exemplary embodiments as depicted in the figures. Shown therein at least to some extent schematically.

For the sake of clarity, the individual designating of all the at least substantially identical components such as, for example, the switch arrangement 110 and the time delay arrays 200, has been dispensed with. However, not to be deduced therefrom is that the non-designated arrays differ from the designated arrays; it is instead to be assumed that the non-designated arrays correspond at least substantially in structure and function to the designated arrays, unless otherwise apparent from the description or obvious to one skilled in the art.

Figure 1:
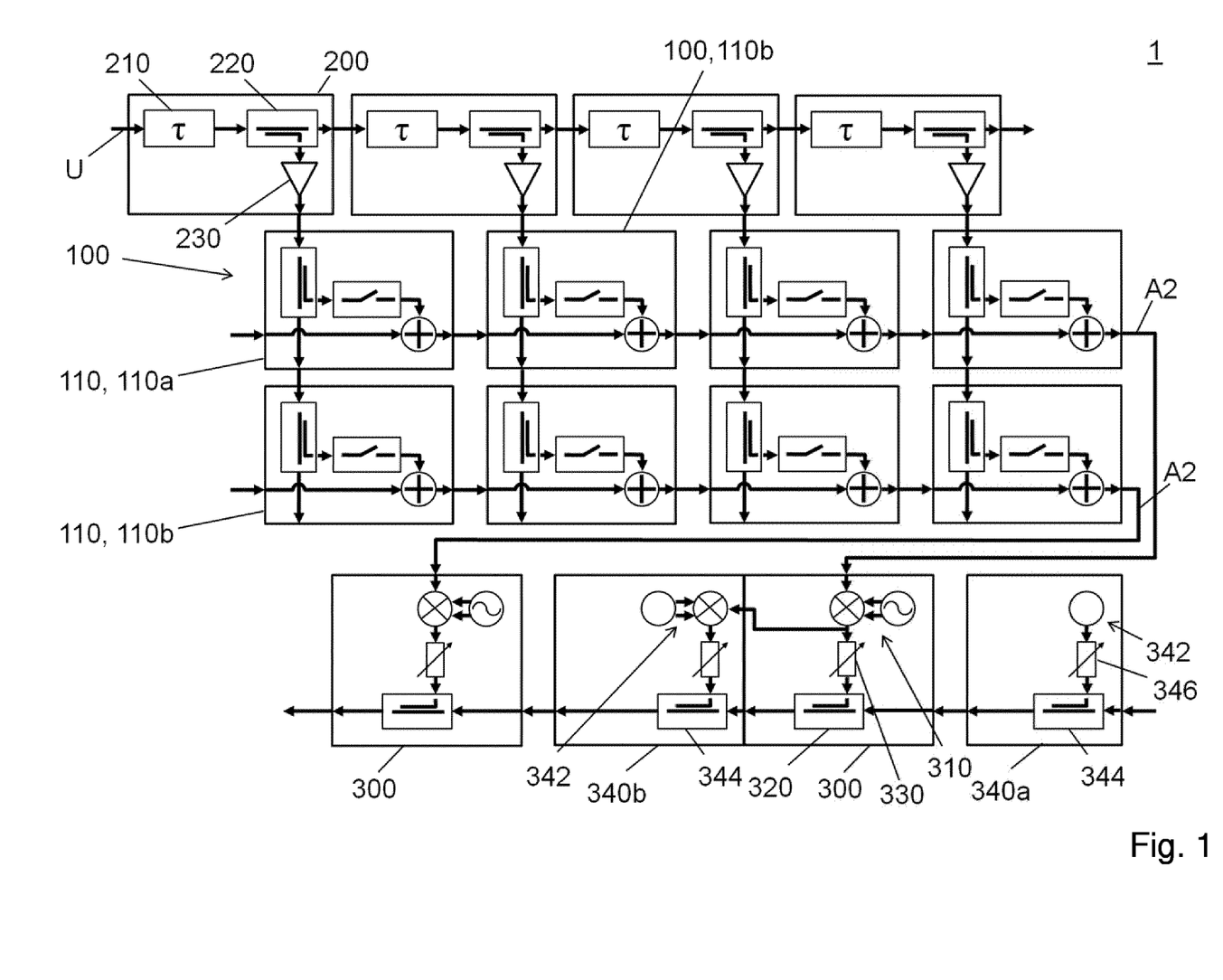
FIG. 1 a circuit diagram of a radar target emulator comprising a switching device according to a first implementation of the present invention.
Figure 1A:
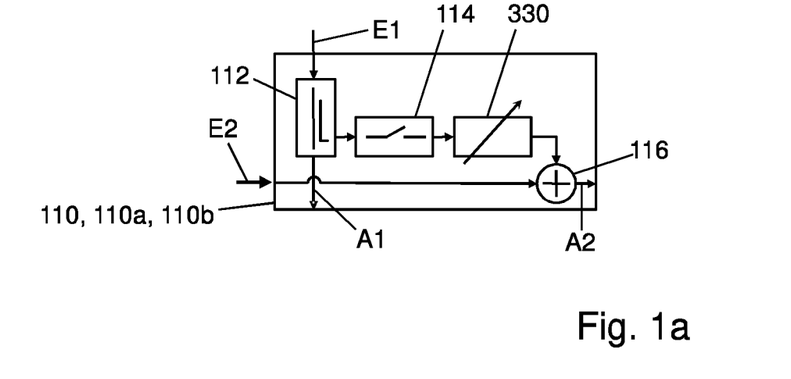
FIG. 1a a circuit diagram of a switch arrangement of the switching device according to one implementation of the present invention.

In FIG. 1, a circuit diagram of a radar target emulator 1 having a switching device 100 according to a first implementation of the present invention is shown and in FIG. 1a, a circuit diagram of a switch arrangement 110 of the switching device 100 according to one implementation of the present invention. The switch arrangement 110, 110a, 110b depicted in FIG. 1a comprises a branching device 112, a switching means 114 and an adder device 116. A first input signal E1 is branched by the branching device 112 into a first output signal A1 and a branch signal which is fed to the switching means 114. The switching means 114 is designed to switch back and forth between at least two switching states, in particular between a first switching state and a second switching state, whereby the branch signal is fed to the adder device 116 in the first switching state and not transmitted in the second switching state. The adder device 116 combines a second input signal E2 and the branch signal into a second output signal A2.

According to one implementation, it is not imperatively necessary to apply a second input signal E2, in particular in the left column of the FIG. 1 switch arrangements, in order to ensure the correct connection. In this case, the second output signal A2 is at least substantially formed exclusively by the branch signal.

It is furthermore possible to amplify or attenuate the branch signal upstream and/or downstream of the switching means 114. In the depicted implementation, the switch arrangement 110, 110a, 110b comprises to that end an attenuating and/or amplifying device 330 which forms part of a signal-carrying connection between the switching means 114 and the encoding device 116. The first output signal A1 corresponds at least substantially to the first input signal E1, wherein, as previously described, a part of same is branched off as a branch signal in the switch arrangement 110, 110a, 110b.

The operating principle behind the switching device 100 designed as switching matrix is now to be illustrated referencing the radar target emulator 1 depicted in FIG. 1: The switching device 100 depicted in FIG. 1 comprises four switch arrangements 110 in a first row and four further switch arrangements 110 in a second row. Together, these form a (4×2) matrix of switch arrangements 110. A first input signal E1, which can however differ from column to column, in particular differ in its delay, as will be described in detail below, is introduced into each switch arrangement 110 of the upper row. Furthermore, a second output signal A2 is provided at the end of each row in relation to the signal direction which can differ from one or more of the other output signals depending on the switching state of switching means 114.

The structure of the matrix as just defined enables any given first input signal E1 to be output as a second output signal A2 at the end from the signal direction perspective of a matrix row. It is moreover likewise possible for a mixture of applied first input signals E1 to be output as a second output signal A2 of the respective row.

According to one implementation of the present invention, the columns of the matrix thus correspond to different distances of objects to be imaged, wherein a separate row is provided for each objects to be imaged. That means that two different objects at different or the same distances to the radar sensor can be emulated independently of each other in the configuration of the radar target emulator 1 depicted in FIG. 1. Particularly advantageously, only one single delay line able to provide differently delayed signals for the emulating of the two objects to be imaged is required to that end.

The following will now describe the structure and operation of a time delay array 200 having a time delay device 210, a branching device 220 and preferably an amplifier device 230 as applicable. An original signal U is delayed by the time delay device 210. As previously described above, a distance of an object to be emulated from the test sensor is imaged by way of said delay. The signal delayed as such is branched by the branching device 220, whereby a branch signal is amplified by the amplifier device 230 and supplied to a first switch arrangement 110a as first input signal E1. In the present case of FIG. 1, four time delay arrays 200 of the just described type are connected in series, wherein a respective output signal of the upstream time delay arrangement 200 comprises, in particular forms, an input signal of the downstream time delay arrangement 200. A total of four first input signals E1 are provided by this series connection for the respective matrix columns of the switching device 100, each differing in their delay.

According to one implementation, the original signal U is a signal output by a real-world radar sensor of a test vehicle, received by a receiver device arranged ahead of the time delay array 200, and fed to the time delay array 200.

The second output signals A2 generated in the manner described above are in each case fed to differing target emulation arrays 300. The target emulation array 300 comprises a vector modulation device 310, an adder device 320 and a variable attenuating and/or amplifying device 330. The object to be emulated is modulated by the vector modulation device 310 to the delayed signal and its amplitude adapted by the variable attenuating and/or amplifying device 330 prior to being transmitted via the adder device 320 as a component of a modulated output signal Am.

In order to generate a more realistic radar signal, it is further possible according to the embodiment of FIG. 1 to generate interference signals as an additional component of the modulated output signal Am. The interference signal arrangements can thereby produce a non-synchronous interference signal, as for example with interference signal arrangement 340a, or a synchronous interference signal, as with interference signal arrangement 340b. An interference signal arrangement 340a, 340b comprises an interference signal supply device 342, an adder device 344 and a variable attenuating and/or amplifying device 346. Similar to the operating of the target emulation array 300 described herein, a corresponding signal (here an interference signal) is generated by the interference signal arrangements 340a, 340b, its amplitude adapted by the variable attenuating and/or amplifying device, and transmitted via the adder device 344 as a component of the modulated output signal Am. The interference signal arrangement 340b, which is designed to generate a synchronized interference signal, is connected in signal-carrying manner to a target emulation array 300 such that the interference signal is modulated to the time-delayed second output signal of the respectively connected target emulation array 300.

Figure 2:
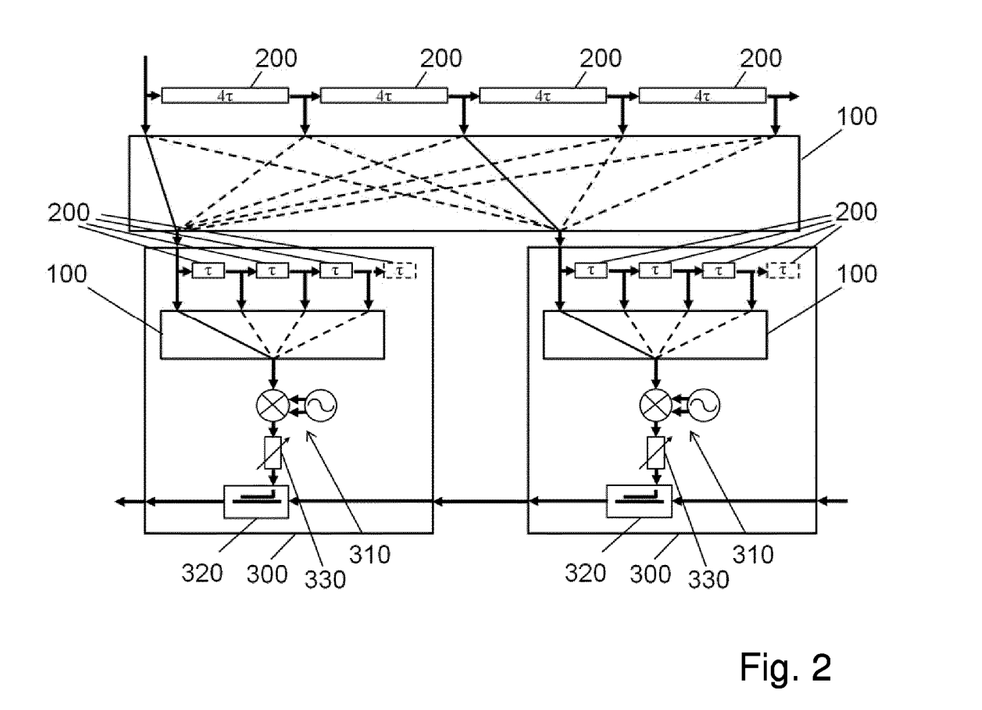
FIG. 2 a circuit diagram of a radar target emulator comprising a switching device according to a second implementation of the present invention.

FIG. 2 shows a circuit diagram of a radar target emulator with a switching device according to a further implementation of the present invention.

Correspondingly identical components are provided with the same reference numerals in this embodiment as in the description referencing FIGS. 1 and 1a. The remarks made in that context apply analogously to FIG. 2, unless otherwise apparent from the following description or obvious to one skilled in the art.

As previously stated above with respect to FIG. 1, the radar target emulator 1 according to FIG. 2 comprises four series-connected time delay arrays 200 which in each case produce a time delay of 4 $\mathsf{T}$. As with the original signal, these first input signals E1 thus generated enter into a switching device 100 of the type described above, albeit constructed in (2×5) form. Each of the second output signals A2 thus generated at the end of each row is fed to a target emulation array 300. A further block of three time delay arrays 200, which are connected in series with each realizing a time delay of $\mathsf{T}$, as well as a further switching device 100 in the form of a (1×4) matrix is interposed ahead of the second output signal A2 of the respective row of the switching device 100 being supplied to the vector modulation device 310. This hierarchical structure to the switching devices and time delay arrays enables the second output signal which is able to be set to 4$\mathsf{T}$ with respect to the delay being further resolved to 1$\mathsf{T}$. This additionally increases the imaging accuracy of the radar target emulator 1, whereby this approach can keep the cost of the four $\mathsf{T}$-delay lines and the above switching device 100 low while improving resolution and scalability for the modulated output signal Am.

Figure 3:
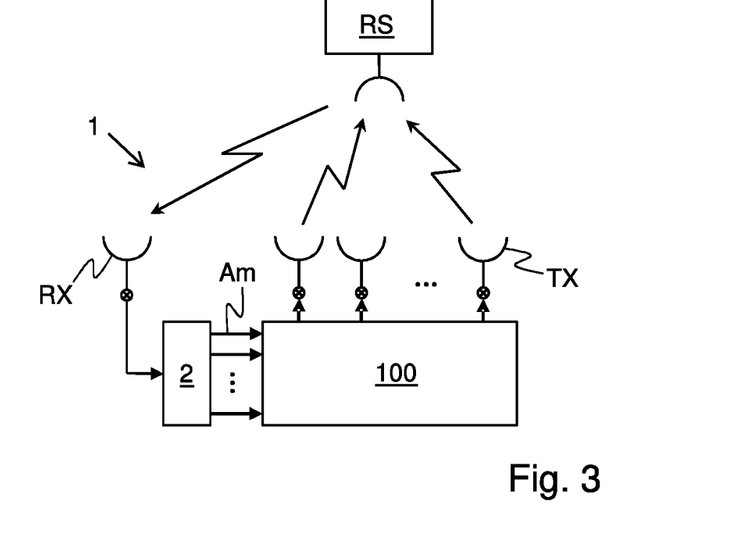
FIG. 3 a circuit diagram of a test bed for stimulating a radar sensor from different directions.

FIG. 3 shows a test bed for the stimulation of a radar sensor RS, e.g. a vehicle, from different directions. The test bed in particular comprises a receiver device RX for receiving radar signals output by the radar sensor RS. A radar signal received as such is received as an original signal U from a radar target emulator 1. The original signal U is divided in a delay and modulation module 2 of the radar target emulator 1 such that a correspondingly modulated output signal Am based on the original signal can be output for each object to be emulated. In one preferential implementation, each of the modulated output signals Am is delayed so that each of the signals output from the delay and modulation module 2 can be assigned to a virtual object at a virtual distance from the radar sensor RS.

In the embodiment shown, the modulated output signals Am are provided at a switching device 100 preferably designed to receive each of the modulated output signals Am, outputting to at least one of a plurality of transmitter devices TX, in particular as second output signals A2, as will be described in greater detail below with reference to FIG. 4.

In one embodiment, the transmitter devices TX are designed to transmit input second output signals A2 as output from the switching device 100 to the radar sensor RS in the form of electromagnetic radiation. In other words, the transmitter devices TX are designed to convert the second output signals A2 into radar signals. Due to the spatial distribution, in particular the spacing from one another, the individual transmitter devices TX receive the radar signals of the radar sensor RS at different angles. Accordingly, a simulated object for the radar sensor RS at a substantially arbitrary position, which is on the one hand adjustable based on the signal distribution of the second output signal A2 to the transmitting devices TX and on the other hand based on the time delay of the corresponding modulated signal Am, can be depicted. The position thereby results from the combination of the (virtual) distance and the position of the transmitter device TX transmitting the radar signal. In other words, the position of an object to be displayed for the radar sensor RS is compiled from a real-world and a virtual component, whereby the real-world component is formed from an angle, in particular an azimuth and/or elevation angle, which depends on the spatial position of the antenna (s) emitting the electromagnetic radiation relative to the radar sensor RS, and the virtual component is formed by the time delay of the corresponding signal.

In order to delay the original signal U and accordingly modulate signal components thereof to the objects to be emulated, the delay and modulation module 2 preferably comprises at least one time delay array 200 and at least one target emulation array 300 which in one embodiment are interconnected such that an (original) signal initially delayed by a time delay array 200 is in each case subsequently modulated by a target emulation array 300. Preferably, the delay and modulation module 2 in each case comprises one time delay array 200 and target emulation array 300 pair for each object to be emulated so that one modulated output signal Am is in each case output or respectively provided at the switching device 100 per object to be emulated.

The delay and modulation module 2 can be of at least partly digital configuration. In particular, the delay and modulation module 2 can be at least partially implemented as a computer program able to be executed on a (not shown) central processing unit and delay and modulate the original signal U when applicably executed. Preferably, the delay and modulation module 2 in this embodiment provides the modulated output signals Am thereby produced to one or more interfaces such that the modulated output signals Am can be received by the switching device 100.

Figure 4:
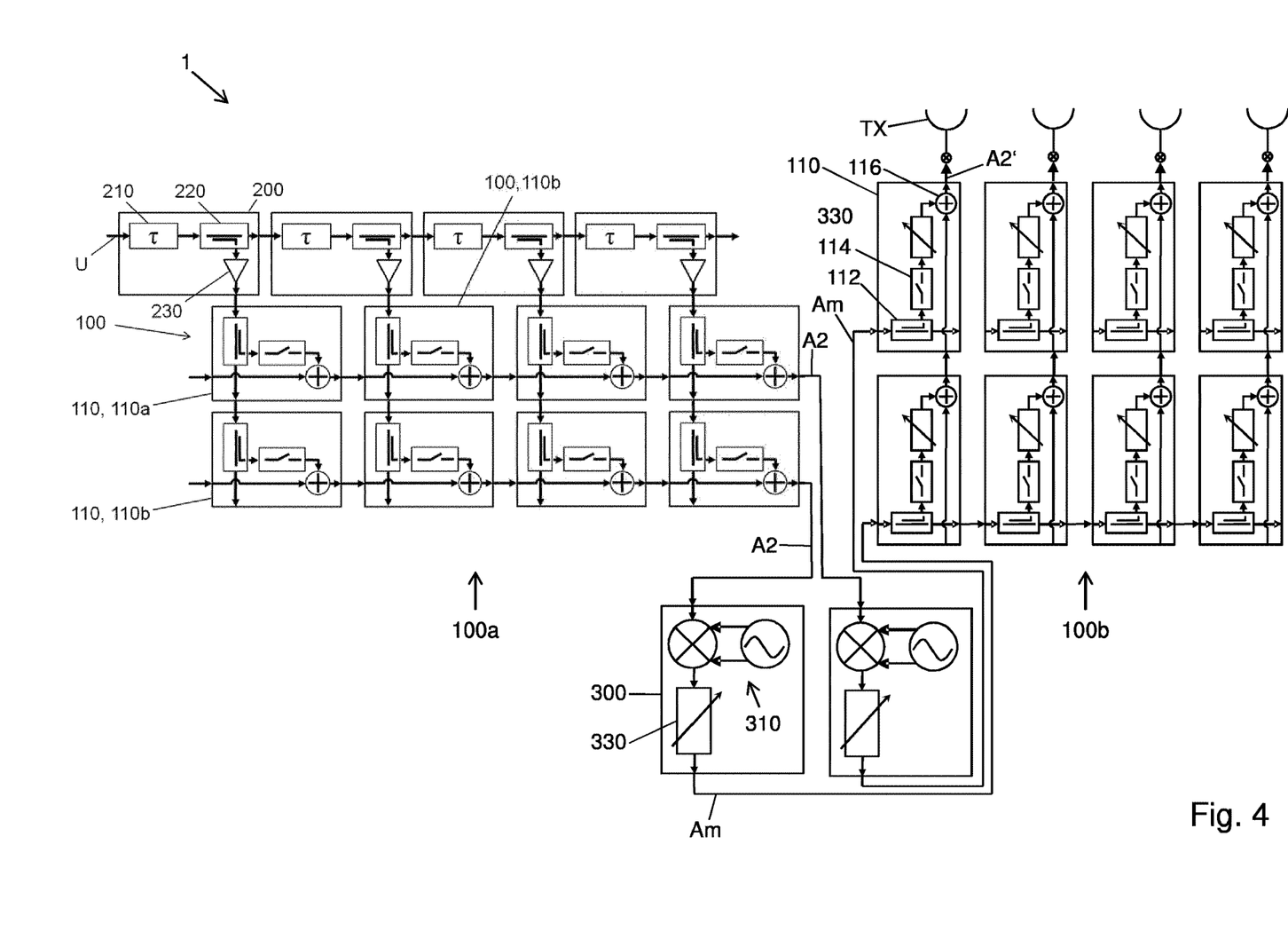
FIG. 4 a circuit diagram of a radar target emulator comprising a switching device according to a third implementation of the present invention.

FIG. 4 shows a circuit diagram of a radar target emulator 1 having a first and second switching device 100a, 100b as per a third embodiment of the present invention. The second switching device 100b is thereby interconnected with a delay and a modulation module 2 designed to receive a radar signal received from a radar sensor RS as original signal U and delay and modulate it so as to be able to output a plurality of delayed and modulated output signals Am, each representing an object distanced from the radar sensor RS to be emulated.

The delay and modulation module 2 can thereby comprise a variant of the embodiment of the invention shown in FIG. 1, in particular be formed by same. In this variant, the original signal U is preferably received by a time delay array 200 downstream of the further, for example three, time delay arrays 200. As stated in conjunction with FIG. 1, the time delay arrays 200 preferably each output a time-delayed branch signal as the first input signal E1 to switch arrangements 110 of the first switching device 100a.

The time-delayed first input signals E1 thereby received by the first switching device 100a are routed through the matrix formed by the switch arrangements 110, which preferably exhibit a number of rows corresponding to the number of objects to be emulated, and thereby branched by branching devices 112, transmitted or respectively not transmitted by switching means 114, and added by adder devices 116 such that the last switch arrangement 110 of the first switching device 100a in the direction of signal in each row of the matrix respectively outputs a time-delayed second output signal A2 which corresponds to a predefined distance of an object to be emulated from the radar sensor RS.

In order to modulate the respective object to be emulated to the time-delayed second output signals A2, the last switch arrangement 110 of the first switching device 100a in each row in the direction of signal is in each case followed by a target emulation array 300 in the present variant of the embodiment depicted in FIG. 1. The modulated output signals Am output by the target emulation arrays 300 thus in each case image an object to be emulated at a predetermined distance.

In the depicted embodiment, the modulated output signals Am provided by the target emulation arrays 300 are received in each case by a first switch arrangement 110 of the second switching device 100b in the signal direction. The switch arrangements 110 of the second switching means 100b are preferably likewise arranged, in particular interconnected, in the form of a matrix, which particularly preferentially has the same number of rows as the matrix formed by the switch arrangements 110 of the first switching device 100a. In other words, the second switching device 100b has one respective row of series-connected switch arrangements 110 for each target emulation array 300; i.e. preferably for each object to be emulated. Thus, each respective signal, which represents an object to be emulated, in each row of the matrix formed by the switch arrangements 110 of the second switching means 100b can be processed independently of other signals in other rows, in particular branched, relayed or not relayed, amplified and/or attenuated, and/or added.

In one embodiment, the modulated output signals Am are routed by the second switching means 100b such that a further two output signals A2' which can contain one or more modulated output signals Am or at least components thereof are provided at the last switch arrangements 110 in the signal direction.

For example, part of the signal from a modulated output signal Am can in each case be preferably branched off by the branching device 112 in a plurality of switch arrangements 110 of the second switching device 100b successively arranged in a row of the matrix and transmitted by the switching means 114 in a first switching state within the respective switch arrangement 110. Each signal component can be further amplified or attenuated by an attenuating and/or amplifying device 330 before being combined as applicable with another modulated output signal Am or a component thereof by the adder device 116.

Thus, as a result, virtually any, in particular weighted, distribution of each modulated output signal Am can be achieved at one or more outputs of the second switching device 100b. In particular, multiple modulated output signals Am or components thereof can be provided at the same output. In other words, each further second output signal A2' can contain one or more objects to be emulated, in particular also part of an object to be emulated.

The further second output signals A2' are preferably received by transmitter devices TX arranged spatially adjacent each other and sent back to the radar sensor RS at different angles as electromagnetic radiation, i.e. as radar signals. By the above-described distribution of the modulated output signals Am, which in each case characterize an object to be emulated, to the further second output signals A2', the objects to be emulated can thus be depicted for the radar sensor RS in different positions within an area defined by the spatial distribution of the transmitter devices TX.

In a further embodiment of the invention, the second switching means 100b is designed to distribute the further second output signals A2' on a two-dimensional spatial arrangement of transmitter devices TX; i.e. a so-called antenna array. Thus, the objects to be emulated can as a result be displayed at different positions both in an azimuth plane as well as in a plane of elevation perpendicular thereto.

Figure 5:
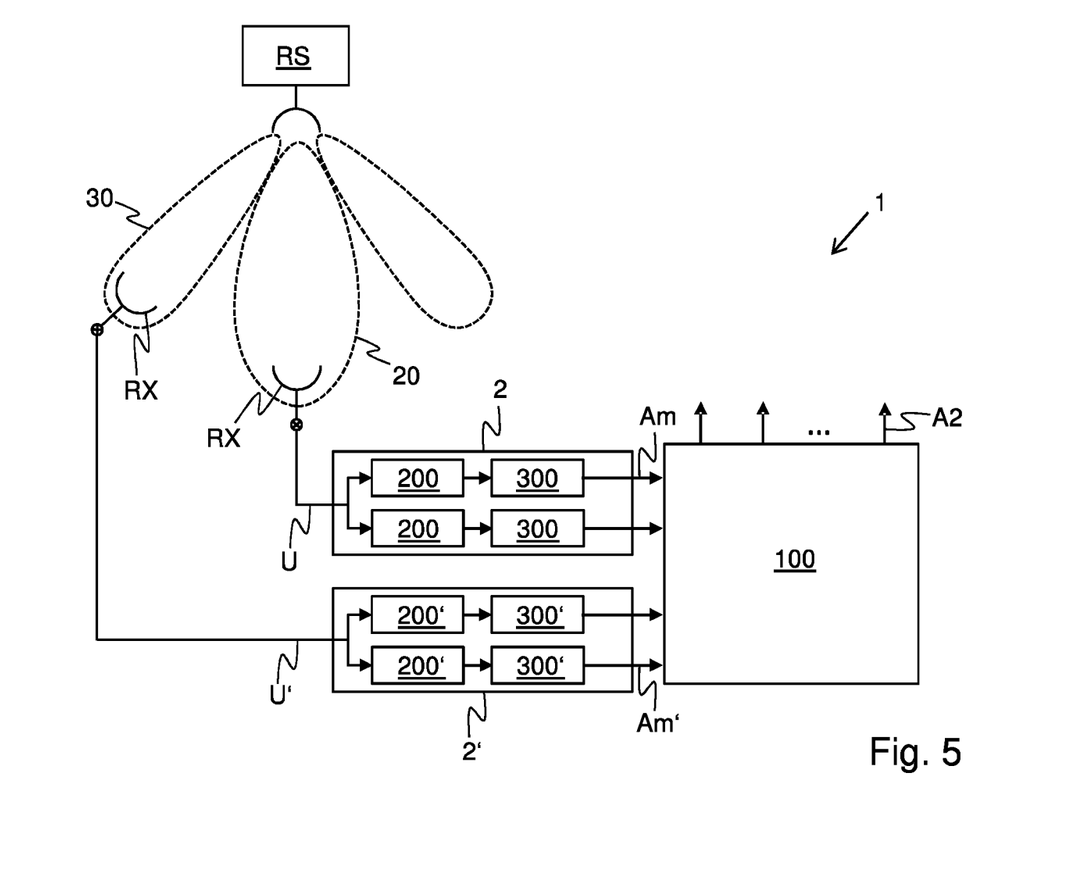
FIG. 5 a circuit diagram of a test bed for detecting radar signals emitted in different directions.

FIG. 5 shows a circuit diagram of a test bed for detecting radar signals emitted by a radar sensor RS in different directions. The different directions are thereby characterized by different detection regions 20, 30 of the radar sensor RS. In the example depicted in FIG. 5, the radar sensor RS is designed to output radar signals, preferably at a first frequency or from a first frequency band respectively or at a first modulation, in a main detection area 20 in order to detect objects in this main detection area 20 on the basis of radar signals reflected on these objects. Furthermore, the radar sensor RS is preferably also designed to output radar signals, preferably at a second frequency different from the first or respectively from a second frequency band different from the first or at a second modulation different from the first, in a secondary detection area 30 in order to detect objects in this secondary detection area 30 on the basis of radar signals reflected on these objects.

In the depicted example, the test bed with which the radar sensors RS can be stimulated comprises a radar target emulator 1 having a plurality of receiver devices RX, delay and modulation modules 2, 2' interconnected with the receiver devices RX, and a switching device 100 interconnected with the delay and modulation modules 2, 2'.

The receiver devices RX are preferably designed to detect radar signals emitted by the radar sensor RS into the main detection area 20 or respectively secondary detection area 30 and provide corresponding original signals U, U'. A receiver device RX arranged in the main detection area 20 for example generates an original signal U corresponding to the radar signal detected in said main detection area 20. A further receiver device RX is for example arranged in the secondary detection area 30 and designed to generate a further original signal U' corresponding to the radar signal detected in said secondary detection area 30.

The original signals U, U' can be received and further processed in each case by a time delay and modulation module 2, 2' which is preferably designed to process the original signals U, U' such that each of the modulated output signals Am, Am' supplied by the time delay and modulation modules 2, 2' characterize a respective emulated object. The time delay and modulation modules 2, 2' to that end preferably each comprise a time delay array 200, 200' and a target emulation array 300, 300' for each object to be emulated.

In the example shown in FIG. 5, a time delay and modulation module 2 is provided with two time delay arrays 200 and two target emulation arrays 300 in order to process the original signal U corresponding to a radar signal detected in the main detection area 20 and provide two corresponding modulated output signals Am. A further time delay and modulation module 2' with two further time delay arrays 200' and two further emulation arrays 300' is provided in order to process the further original signal U' corresponding to a radar signal detected in the secondary detection area 30 and provide two corresponding further modulated output signals Am'. It is accordingly possible with this embodiment to emulate two objects interacting with radar signals within the main detection area 20 and additionally two further objects interacting with radar signals within the secondary detection area 30.

In other embodiments of the invention, the time delay and modulation modules 2, 2' can of course also exhibit additional or fewer time delay arrays 200, 200' and/or target emulation arrays 300, 300' so as to respectively emulate a corresponding number of objects in the different detection areas 20, 30 of the radar sensor RS.

It is of course also possible to provide additional receiver devices RX and time delay and modulation modules 2, 2' associated; i.e. interconnected, with same so as to cover further detection areas 20, 30 of the radar sensor.

The provided modulated output signals Am and modulated further output signals Am' can then be received by the switching device 100, in particular at the first switch arrangements in the direction of signal and, as described in conjunction with FIG. 4, provided applicably weighted and added; i.e. mixed, to last switch arrangements in the direction of signal, in particular output to transmitter devices (see FIG. 4) as second signals A2 via further switch arrangements interconnected as a matrix.

By the switching device 100 being interconnected with the transmitter devices, the emulated objects for the radar sensor RS characterized by the output signals Am, Am' can in particular be depicted from almost any given direction. For example, it is possible to correspondingly delay and modulate a radar signal detected in the main detection area 20 for an object to be emulated and send the signal processed as such back to the radar sensor RS via a sensor device arranged in the secondary detection area 30. This signal can thereby in particular be overlain by a further signal formed from a delayed and modulated radar signal detected in the secondary detection area 30 and corresponding to a further object to be emulated. This then for example enables emulating the situation in which a radar signal emitted from the radar sensor RS into the main detection area 20 is reflected from an object in the main detection area 20 to an object in the secondary detection area 30 and from there back to the radar sensor RS.

It is noted that the above-described exemplary embodiments are merely examples which are in no way to limit the protective scope, application or design. Rather, the preceding description affords one skilled in the art a guideline for the implementation of at least one exemplary embodiment, whereby various modifications can be made, in particular with regard to the function and arrangement of the described components, without departing from the protective scope as results from the claims and these equivalent feature combinations. In particular, time delays at other multiples of $\tau$, for example $2\tau$ or $4\tau$, can also be generated by the time delay devices (200) and switching devices (100) can form any type of matrix, for example 1×4 or 2×5.

LIST OF REFERENCE NUMERALS 1 radar target emulator
2 delay and modulation module
20 main detection area
30 secondary detection area
100 switching device
110 switch arrangement
110a (first) switch arrangement
110b (second) switch arrangement
112 branching device (of switch arrangement)
114 switching means
116 adder device (of switch arrangement)
200 time delay array
200' further time delay array
210 time delay device
220 branching device (of time delay array)
230 amplifier device
300 target emulation array
300' further target emulation array
310 vector modulation device
320 adder device (of target emulation array)
330 variable attenuating and/or amplifying device
340a interference signal arrangement
340b interference signal arrangement
342 interference signal supply device
344 adder device (of interference signal arrangement)
346 variable attenuating and/or amplifying device (of interference signal arrangement)
A1 first output signal
A2 second output signal
A2' further second output signal
Am modulated output signal
Am' modulated further output signal
E1 first input signal
E2 second input signal
U original signal
U' further original signal
RS radar sensor
RX receiver device
TX transmitter device

What is claimed is:

1. A radar target emulator, comprising:
    a first switching device, comprising:
        a first switch arrangement and a second switch arrangement, each having:
            a branching device designed to receive a first input signal and to branch the first input signal into a branch signal and a first output signal;
            a switch designed to transmit the branch signal in a first switching state within the first or second switch arrangement and not transmit the branch signal in a second switching state; and an adder device designed to output the branch signal transmitted in the first switching state of the switch at least as a component of a second output signal;

wherein the first switch arrangement and the second switch arrangement are interconnected such that:
the first input signal of the second switch arrangement comprises the first output signal of the first switch arrangement, or
a second input signal of the second switch arrangement comprises a second output signal of the first switch arrangement;

a time delay array, comprising:
a time delay device designed to receive and delay an original signal and/or a branching device output signal of an upstream time delay array and provide it as a delayed signal; and
a branching device designed to receive the delayed signal, branch it into a branch signal and a first output signal, feed the branch signal to a first switch arrangement of the first switching device as a first input signal, and output a first output signal; and a target emulation array designed to receive a second output signal of the first switching device, modulate the second output signal, and provide a modulated output signal.

2. The first switching device according to claim 1, further comprising further switch arrangements that are at least substantially similar in configuration to the first and/or second switch arrangement, wherein a first input signal of a downstream switch arrangement comprises a first output signal of a respective upstream switch arrangement.

3. The first switching device according to claim 1, further comprising further switch arrangements that are at least substantially similar in configuration to the first and/or second switch arrangement, wherein a second input signal of a downstream switch arrangement comprises a second output signal of a respective upstream switch arrangement.

4. The first switching device according to claim 1, wherein the first and second switch arrangements are connected in a matrix.

5. The first switching device according to claim 4, wherein the matrix comprises a plurality of rows and/or columns.

6. The first switching device according to claim 1, wherein the first and second switch arrangements each further comprise a variable attenuating and/or amplifying device designed to amplify and/or attenuate the branch signal.

7. The radar target emulator according to claim 1, wherein the time delay array further comprises an amplifying device designed to amplify the first input signal prior to the first input signal being fed to the first switch arrangement of the first switching device.

8. A radar target emulator, comprising:
a second switching device, comprising:
a first switch arrangement and a second switch arrangement, each having:
a branching device designed to receive a first input signal and to branch the first input signal into a branch signal and a first output signal;
a switch designed to transmit the branch signal in a first switching state within the first or second switch arrangement and not transmit the branch signal in a second switching state; and
an adder device designed to output the branch signal transmitted in the first switching state of the switch at least as a component of a second output signal;

wherein the first switch arrangement and the second switch arrangement are interconnect such that,
the first input signal of the second switch arrangement comprises the first output signal of the first switch arrangement, or
a second input signal of the second switch arrangement comprises a second output signal of the first switch arrangement;

a time delay array having a time delay device designed to receive and delay an original signal and provide the original signal as a delayed signal; and a target emulation array designed to receive the delayed signal, modulate the delayed signal, and provide a modulated output signal, wherein the modulated output signal provided by the target emulation array is provided as a second input signal to a switch arrangement of the switching device.

9. The radar target emulator according to claim 8, further comprising at least two transmitter devices, each designed to receive a second output signal of the switching device and emit the second output signal as an electromagnetic radiation.

10. The radar target emulator according to claim 9, wherein the at least two transmitter devices are adjacently arranged such that objects emulated by means of the emitted electromagnetic radiation can be depicted in at least one of an azimuth angular field or an elevation angular field.

11. The radar target emulator according to claim 8, further comprising:
a further time delay array having a time delay device designed to receive and delay a further original signal and provide the further original signal as a further delayed signal; and
a further target emulation array designed to receive the further delayed signal, modulate a signal of the further delayed signal, and provide a modulated further output signal,
wherein the modulated output signal and the modulated further output signal provided by the target emulation array and the further target emulation array are provided as second input signals to the switch arrangement of the switching device.

12. The radar target emulator according to claim 11, further comprising at least two receiver devices, each designed to detect a radar signal output by a radar sensor and provide a corresponding original signal, wherein the time delay device of the time delay array is designed to receive an original signal provided by one of the at least two receiver devices, and the time delay device of the further time delay array is designed to receive a further original signal provided by a further of the at least two receiver devices.

13. The radar target emulator according to claim 1, wherein the target emulation array further comprises:
a vector modulation device designed to modulate the second output signal or the delayed signal provided by the time delay array by means of a Doppler shift signal modulation and provide the second output signal or the delayed signal provided by the time delay array, respectively, in the form of an intermediate signal; and/or
an adder device designed to output the intermediate signal as at least part of a modulated output signal.

14. The radar target emulator according to claim 13 further comprising a second switching device, wherein the target emulation array further comprises a variable attenuating and/or amplifying device that is designed to adjust an amplitude of the intermediate signal prior to the intermediate signal being supplied to the adder device or adjust an amplitude of the Doppler-shifted modulated signal prior to output to a switch arrangement of the second switching device.

15. The radar target emulator according to claim 1, further comprising an interference signal arrangement comprising:
an interference signal supply device designed to provide an interference signal; and
an adder device designed to output the interference signal as at least part of the modulated output signal.

16. The radar target emulator according to claim 15, wherein the interference signal arrangement further comprises a variable attenuating and/or amplifying device designed to adjust an amplitude of the interference signal prior to the interference signal being supplied to the adder device.

17. The radar target emulator according to claim 15, wherein the interference signal arrangement is connected in a signal-conducting manner to the target emulation array, wherein an intermediate signal of the target emulation array is at least partially transmitted prior to being supplied to the adder device; and wherein said intermediate signal serves as the basis for providing the interference signal.

18. The radar target emulator according to claim 1, wherein the target emulation array further comprises:
at least one further switching device; and
at least one further time delay array comprising:
a time delay device designed to receive and delay the second output signal or a first output signal of an upstream time delay array and provide it as a delayed signal; and
a branching device designed to receive the delayed signal, branch the delayed signal into a branch signal and an output signal, supply the branch signal to a further switch arrangement as an input signal, and output said output signal.

19. The radar target emulator according to claim 1, further comprising a second switching device substantially similar to the first switching device, wherein the target emulation array is connected to the first and second switching devices such that the target emulation array receives the second output signal of the first switching device, modulates the second output signal, and provides another modulated output signal as a second input signal to a first switch arrangement of the second switching device.

* * * * *